(12) United States Patent
Irinatsu et al.

(10) Patent No.: US 6,179,957 B1
(45) Date of Patent: *Jan. 30, 2001

(54) METHOD FOR CONTROLLING DEINKING PROCESS USING CONTACT ANGLE

(75) Inventors: Yuichi Irinatsu; Yoshitaka Miyauchi; Hiromichi Takahashi, all of Wakayama (JP)

(73) Assignee: Kao Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/101,017
(22) PCT Filed: May 27, 1997
(86) PCT No.: PCT/JP97/01795
§ 371 Date: Jun. 29, 1998
§ 102(e) Date: Jun. 29, 1998
(87) PCT Pub. No.: WO97/46754
PCT Pub. Date: Dec. 11, 1997

(30) Foreign Application Priority Data

Jun. 3, 1996 (JP) .................................. 8-140249

(51) Int. Cl.⁷ ............................... D21B 1/08; D21C 5/02
(52) U.S. Cl. ....................................... 162/4; 162/5; 162/6
(58) Field of Search .......................... 162/4, 5, 6

(56) References Cited

U.S. PATENT DOCUMENTS 5,173,176 * 12/1992 Klimpel et al. .................... 209/166

FOREIGN PATENT DOCUMENTS

| | | |
|---|---|---|
| 478505 | * 9/1991 | (EP) . |
| 52-31563 | 3/1977 | (JP) . |
| 57-210093 | 12/1982 | (JP) . |
| 63-196789 | 8/1988 | (JP) . |
| 646190 | 1/1989 | (JP) . |
| 4-308289 | 10/1992 | (JP) . |
| 7-504235 | 5/1995 | (JP) . |
| 94/28237 | * 9/1991 | (WO) . |

OTHER PUBLICATIONS

Panek, J.C. "Interfacial . . . Deinking", IPST, Aug. 1995.*

Schriver, K.E. "Mill Chemistry . . . Decision", Paper Recycling, pp. 131–134, 1991.*

Abstract of J. C. Panek et al., IPST, Technical Paper Series, 594 (Atlanta, GA): 24 p. (Aug. 1995).

B.A. Snyder et al., Progress in Paper Recycling 3, No. 1: 17–26 (Nov. 1993).

* cited by examiner

*Primary Examiner*—Dean T. Nguyen
(74) *Attorney, Agent, or Firm*—Birch, Stewart, Kolasch & Birch LLP

(57) ABSTRACT

In a deinking process at least comprising the step of stripping ink from wastepaper as the starting material and the step of removing the stripped ink from a flotation system, the contact angle of the aqueous solution portion of a slurry containing the stripped ink with the interfaces of ink particles in the flotation step is controlled to be at least 70°.

11 Claims, No Drawings

METHOD FOR CONTROLLING DEINKING PROCESS USING CONTACT ANGLE

This application is the national phase under 35 U.S.C. §371 of prior PCT International Application No. PCT/JP97/01795 which has an International filing date of May 27, 1997 which designated the United States of America, the entire contents of which are hereby incorporated by reference.

BACKGROUND OF INVENTION

1. Field of the Invention

The present invention relates to a deinking method for deinking wastepapers such as newspapers, leaflets and magazines in order to recycle them. More particularly, the present invention relates to a deinking process according to which good-quality pulp sheets reduced in sad color can be obtained.

2. Prior Arts

Wastepapers are recycled by stripping ink from the wastepapers by a deinking treatment to prepare recycled pulp and manufacturing recycled paper from the recycled pulp. The conventional deinking methods generally comprise a step of stripping ink from wastepapers and a step of discharging the stripped ink.

More specifically, the deinking method comprises as main steps:
(1) a step of pulping (disintegrating) wastepapers,
(2) a step of aging, i.e., leaving the disintegrated paper as it is,
(3) a step of flotation, and
(4) a step of washing.

That is, in deinking treatment, ink bound to the fibers of wastepapers is physically and chemically (or biochemically) stripped therefrom to thereby separate the ink from the fibers. Thus, recycled pulp is obtained.

The foregoing ink stripping in the conventional deinking treatment is generally carried out at a high pH (pH: 10 to 9), followed by the removal of the ink under the same conditions in the flotation step.

A deinking agent for use in the ink stripping step and the ink removal step has hitherto been required to have different properties for the respective steps. Specifically, a deinking agent for use in the ink stripping step is required to improve the wettability and permeability of pulp with ink and increase the ink-stripping power while having excellent ink-dispersing properties in order to prevent redeposition. On the other hand, a deinking agent for use in the ink removal step is required to have a foaming power and foam-breaking properties in the course of washing.

It has been believed that improvements in such performances can generally be attained by lowering the surface tension and hence, increasing the hydrophilicity of ink interfaces, i.e., lowering the contact angle of the aqueous solution of a deinking agent (aqueous solution portion of slurry) with ink interfaces is a matter of necessity for improvements in performances.

From the viewpoint of ink removal, however, a deinking agent having good ink-stripping and ink-dispersing properties involves a particular problem of "sad color" because the ink is excessively dispersed such that the ink is insufficiently adsorbed on the bubbles, thus failing to provide satisfactory whiteness. This "sad color" deteriorates the appearance of printed matter prepared by using recycled paper. Thus, in order to prevent this problem, a large amount of virgin pulp must be added. In other words, the problem of "sad color" cannot well be solved with any approach from the viewpoint of an improvement in the wettability of ink interfaces or an increase in the hydrophilicity of ink interfaces as has hitherto been proposed.

DISCLOSURE OF THE INVENTION

Summary of Invention

As a result of detailed investigations on how to remove fine particles of ink from pulp after sufficient ink stripping, the inventors of the present invention have found out that the foregoing problem of "sad color" can be solved so as to provide good-quality pulp sheets when the contact angle of the aqueous solution of a deinking agent with ink interfaces, on which investigations have hitherto been made with the aim of more lowering the contact angle, is heightened in the flotation step to the contrary. More specifically, they have found out that the removal of fine particles of ink proceeds to remarkably decrease the appearance of sad color particularly when the contact angle of the aqueous solution portion of a slurry containing stripped ink with ink interfaces in a flotator is at least 70°. The present invention has been completed based on these findings.

The present invention provides a deinking process comprising at least the step of stripping ink from a pulp slurry formed from wastepaper as the starting material wherein at least one surfactant is used for ink stripping, and the step of removing the stripped ink by flotation, characterized by controlling before or in the flotation step the contact angle of the aqueous solution portion of said pulp slurry containing said stripped ink with the interfaces of ink particles to be at least 70°.

The present invention further provides a method for controlling the deinking performance in a deinking process comprising at least the step of stripping ink from a pulp slurry formed from wastepaper as the starting material, and the step of removing the stripped ink by flotation, characterized by measuring before or in the flotation step the contact angle of the aqueous solution portion of said pulp slurry containing said stripped ink with the interfaces of ink particles and adjusting the contact angle to a value of at least 70°. The adjustment of the contact angle may be conducted before or in the flotation step. It may be conducted during or at least at a point in time of the flotation step.

Thus the present invention provides a deinking process at least comprising the step of stripping ink from wastepaper as the starting material and the step of removing the stripped ink by the flotation method, characterized by using at least one surfactant for ink stripping and controlling the contact angle of the aqueous solution portion of a slurry containing the stripped ink with the interfaces of ink particles in the flotation step to be at least 70°.

The deinking process of the present invention is characterized by controlling the contact angle of the aqueous solution portion of the slurry containing the stripped ink with the interfaces of ink particles in the flotation step to be in the range of at least 70°, preferably 70 to 100°, further preferably 70 to 90°. Furthermore, it is possible to control this contact angle to be in the above-mentioned range before entering the flotation step. Also it is permissible to examine a method of controlling the contact angle to be in the above-specified range in the flotation step separately on a laboratory scale and apply this method to the operation on a real equipment level in factories or the like. In this case, the contact angle control method found out preliminarily may be applied to the operation of real equipment.

The contact angle is measured in the following manner.

<Contact Angle Measurement>

A glass plate is coated with a resin component obtained by removing the liquid component of a newspaper ink to form an ink plate. Alternatively, an ink plate may be formed by adding water to wastepaper for use in deinking to prepare an aqueous solution of 5% in pulp concentration, subjecting the solution to disintegration with a bench disintegrator, subjecting the resulting solution to Soxhlet extraction with chloroform for 48 hours to obtain an extract as an ink composition, subjecting the ink composition to GPC preparatory column chromatography of 100,000 in exclusion limit molecular weight to separate and collect a resin component of at least 1,000 in molecular weight in the ink composition, and coating a glass plate with the resin component. An aqueous solution obtained by filtration of a slurry in a flotator before the flotation step of the deinking process is dropped on an ink plate formed according to one of the foregoing procedures to measure the contact angle therebetween. The use of the resin component as an ink sample is based on a belief that the ink portion removed by deinking is a solid portion, while drying oil, semidrying oil and mineral oil are not involved in ink removal.

The contact angle of the aqueous solution portion of a slurry with ink interfaces in a flotator is about 60° in conventional deinking methods. There is even a deinking agent capable of further lowering this contact angle from the viewpoint of the aforementioned direction of development of a deinking agent. Even in the deinking process of the present invention, the contact angle of the aqueous solution portion of a slurry with ink interfaces is likewise set as low as possible in the ink-stripping step, whereas this contact angle is adjusted in the flotation step (ink removal step) to at least 70° for carrying out the flotation step in the direction opposite to the conventional direction, whereby the appearance of sad color can be decreased remarkably. Although the reason why the appearance of sad color is decreased according to the process of the present invention has not been elucidated, the following reason is conceivable by way of example. The adsorbability of fine particles of ink on bubbles is generally weak. In this sense, they must have an at least specified particle size. By contrast, according to the present invention, it is believed that an increase in the contact angle of the aqueous solution portion of a slurry with ink interfaces, i.e., an increase in the hydrophobicity of ink interfaces, brings about either mutual hydrophobic agglomeration of ink droplets to increase the size of ink agglomerates to a size capable of making them easily adsorbable on bubbles to thereby efficiently remove ink, or efficient hydrophobic adsorption of ink on bubble interfaces, which are believed to be high in hydrophobicity, to thereby remove ink.

In the present invention, the contact angle can be controlled by, for example, adding to the slurry at least one member selected from among silicon-containing organic compounds, fluorine-containing organic compounds, and fatty acids. The silicon-containing organic compounds include silicone oil emulsions and silicon surfactants. The fluorine-containing organic compounds include perfluoroalkyl ether compounds such as perfluoroalkylethanols, while fatty acids include middle- to long-chain fatty acids such as stearic acid, preferably long-chain fatty acids having 12 to 20 carbon atoms. The above-mentioned contact angle control may alternatively be carried out by adjusting the pH of the slurry and adding to the slurry at least one compound selected from the group consisting of cationic compounds, amines, acid salts of amines, and amphoteric compounds. In this case, the pH is adjusted in the range of 4 to 10.

As a result of further detailed investigations on the contact angle with the interfaces of ink particles and the deinking performance on the basis of the foregoing findings, the inventors of the present invention have found out that there is a correlation between the contact angle and the results of deinking (the sad color of the pulp sheet in particular) in the flotation step. Specifically, in an arbitrary deinking process including the flotation step, when the contact angle with the interfaces of ink particles in the flotation step at the time when the desired results are obtained are measured to select a suitable range of the contact angle in the system, the final results of deinking can be estimated merely by observing whether or not the contact angle in the system is in the suitable range during or at least at a point in time of the actual operation of deinking treatment (flotation step). In other words, it can be judged that the results of deinking obtained by this deinking treatment can be improved when, for example, the contact angle of the aqueous solution portion of the slurry with the interfaces of ink particles in the flotation step is at least 70° as described above. When this contact angle is lower than 70° to the contrary, it can be estimated that the results of deinking are poor. This method of the present invention for estimating the results of deinking from the contact angle with the interfaces of ink particles in the flotation step is so highly reliable that it serves as an effective means for controlling the deinking treatment in the operation of real equipment.

Accordingly, the present invention provides a deinking process at least comprising the step of stripping ink from wastepaper as the starting material and the step of removing the stripped ink by the flotation method, characterized by continuing deinking treatment when the contact angle of the aqueous solution portion of a slurry with the interfaces of ink particles in the flotation step is at least 70°. The present invention also provides a deinking process comprising at least the step of stripping ink from wastepaper as the starting material and the step of removing the stripped ink by the flotation method, estimating the deinking performance by determining a contact angle at interfaces between the aqueous solution of the slurry and the ink particles in the flotation step.

DETAILED DESCRIPTION OF THE INVENTION

In the deinking process of the present invention, at least one surfactant is used for ink stripping. As the surfactant, there can be used those known as conventional deinking agents, preferably cationic surfactants, anionic surfactants, and nonionic surfactants, among which nonionic surfactants are especially preferred. The use of at least one member selected from among the following nonionic surfactants (A) to (D) is preferred. The following nonionic surfactants (A), (B) and (C) are especially preferred, among which the following nonionic surfactant (C) is further preferred.

<Nonionic surfactant (A): A reaction product obtained by adding an alkylene oxide to a mixture of an oil & fat and an alcohol>

A nonionic surfactant (A) is an alkylene oxide adduct of a mixture of an oil & fat and a mono- or polyhydric alcohol. The alkylene oxide is added to the mixture described above in an amount, on the average, of 5 to 300 moles, preferably 20 to 150 moles, per mole of the mixture. Examples of the alkylene oxide include ethylene oxide, propylene oxide, and butylene oxide, which may be used alone or in the form of a mixture of two or more of them.

The mixing ratio of the oil & fat to the alcohol is preferably 1/0.1 to 1/6, particularly preferably 1/0.3 to 1/3. When this ratio falls with in the above-mentioned range, a reclaimed pulp having an excellent appearance can be obtained since the ink stripping is efficiently attained.

Examples of the oils & fats as a starting material of the nonionic surfactant (A) include vegetable oils such as coconut oil, palm oil, olive oil, soybean oil, rape seed oil, and linseed oil; animal oils such as lard, beef tallow, and bone oil; and fish oils; hardened oils and semihardened oils thereof; and recovered oils obtained in refining processes of these oils & fats. Especially preferred are coconut oil, palm oil, and beef tallow.

Examples of the monohydric alcohol as a starting material of the nonionic surfactant (A) include those having an alkyl or alkenyl moiety of 8 to 24 carbon atoms, and those having an alkylphenyl moiety wherein the alkyl moiety has 6 to 14 carbon atoms. Those having an alkyl moiety of 12 to 18 carbon atoms are preferred. Specific examples thereof include 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-heneicosanol, 1-docosanol, 1-tricosanol, 1-tetracosanol, 2-octanol, 2-nonanol, 2-decanol, 2-undecanol, 2-dodecanol, 2-tridecanol, 2-tetradecanol, 2-pentadecanol, 2-hexadecanol, 2-heptadecanol, 2-octadecanol, 2-nonadecanol, 2-eicosanol, 2-octen-1-ol, 2-dodecen-1-ol, 2-undecen-1-ol, 2-tetradecen-1-ol, 2-pentadecen-1-ol, 2-hexadecen-1-ol, 2-octadecen-1-ol, 8-nonen-1-ol, 10-undecen-1-ol, 11-dodecen-1-ol, 12-tridecen-1-ol, 15-hexadecen-1-ol, oleyl alcohol, elaidyl alcohol, linoleyl alcohol, linolenyl alcohol, eleostearyl alcohol, ricinoyl alcohol, cyclononanol, cyclodecanol, cycloundecanol, cyclododecanol, cyclotridecanol, cyclotetradecanol, cyclopentadecanol, cyclohexadecanol, cycloheptadecanol, cyclooctadecanol, cyclononadecanol, cycloeicosanol, octylphenol, and nonylphenol.

Examples of the polyhydric alcohols as a starting material of the nonionic surfactant (A) include ethylene glycol, propylene glycol, trimethylene glycol, butylene glycol, 1,6-hexane glycol, 2-ethylbutane-1,2,3-triol, glycerol, trimethylolpropane, trimethylolethane, 1,2,4-butanetriol, 1,2,6-hexanetriol, 1,1,1-trimethylolhexane, tetramethylolcyclohexanol, diglycerol, mannitane, pentaerythritol, erythritol, arabitol, sorbitol, D-glycero-D-galactoheptose, D-glycero-D-glucoheptose, D-glycero-D-mannoheptose, D-glycero-L-mannoheptose, D-altroheptulose, D-mannoheptulose, D-altro-3-heptulose, D-glycero-D-galaheptitol, D-erythro-D-galaoctitol, D-glycero-D-mannooctulose, D-erythro-L-glononulose, cellobiose, maltose, lactose, gentianose, cellotriose, and stachyose. Preferred are ethylene glycol, propylene glycol, glycerol, and trimethylolpropane.

<Nonionic surfactant (B): a compound represented by the formula: $RCOO(AO)_mR'$>

Wherein R represents an alkyl or alkenyl group having 7 to 23 carbon atoms; R' represents a hydrogen atom, an alkyl group having 1 to 22 carbon atoms, an alkenyl group having 2 to 22 carbon atoms, or an acyl group having 2 to 22 carbon atoms, preferably a hydrogen atom; AO represents an oxyalkylene group having 2 to 4 carbon atoms; and m is an integer of 1 or more.

When the carbon atom number of the alkyl or alkenyl group in the definition of R is 7 to 23, the nonionic surfactant (B) exhibits an excellent ink-collecting ability and an excellent ink-stripping ability to thereby provide reclaimed pulp having a high whiteness and excellent appearance.

When the carbon atom number of the alkyl, alkenyl or acyl group in the definition of R' is 22 or less, the nonionic surfactant (B) exhibits an excellent ability for stripping ink from cellulose to thereby provide reclaimed pulp having an excellent appearance, and exhibits an appropriate lathering power to thereby attain an excellent workability.

The nonionic surfactant (B) is prepared by adding an alkylene oxide to a fatty acid by a conventional method, optionally followed by esterification or acylation. The alkylene oxide is added to a fatty acid in an amount, on the average, of 5 to 300 moles, preferably 10 to 150 moles, per mole of the fatty acid. That is, the nonionic surfactant (B) is generally a reaction product mixture comprising compounds each represented by the above-mentioned formula: $RCOO(AO)_mR'$. Examples of the alkylene oxide include those mentioned in the above explanation relating to the nonionic surfactant (A). It is preferred to use ethylene oxide and propylene oxide in a molar ratio of ethylene oxide to propylene oxide of 1/5 to 5/1 in the production of nonionic surfactant (B).

Examples of the fatty acids to be used for producing the nonionic surfactant (B) include those having an alkyl or alkenyl moiety, corresponding to R, of 7 to 23 carbon atoms, and specific examples thereof include caprylic acid, pelargonic acid, capric acid, undecanoic acid, lauric acid, tridecanoic acid, myristic acid, pentadecanoic acid, palmitic acid, margaric acid, stearic acid, oleic acid, elaidic acid, linoleic acid, linolenic acid, stearolic acid, ricinoleic acid, ricinoelaidic acid, nonadecanoic acid, arachidic acid, heneicosanoic acid, behenic acid, brassidic acid, erucic acid, tricosanoic acid, tetracosanoic acid, coconut oil fatty acid, beef tallow fatty acid, palm oil fatty acid, tall oil fatty acid, rape oil fatty acid, and fish oil fatty acid. Among nonionic surfactants (B), those having an alkyl or alkenyl group, particularly an alkyl group, represented by R of 11 to 23 carbon atoms are preferred.

<Nonionic surfactant (C): A compound represented by the formula: $RO(AO)_nH$>

Wherein R represents an alkyl or alkenyl group having 8 to 24 carbon atoms; AO represents an oxyalkylene group having 2 to 4 carbon atoms; and n is an integer of 1 or more.

When the carbon atom number of the alkyl or alkenyl group in the definition of R is 8 to 24, the nonionic surfactant (C) exhibits an excellent ability for stripping ink from cellulose to thereby provide reclaimed pulp having a high whiteness and an excellent appearance.

The nonionic surfactant (C) is prepared by adding an alkylene oxide to a monohydric alcohol by a conventional methods. The alkylene oxide is added to a monohydric alcohol in an amount, on the average, of 5 to 300 moles, preferably 7 to 150 moles, per mole of the monohydric alcohol. That is, the nonionic surfactant (C) is generally a reaction product mixture comprising compounds each represented by the above-mentioned formula: $RO(AO)_nH$. Examples of the alkylene oxide include those mentioned in the above description relating to the nonionic surfactant (A). It is preferred to use ethylene oxide and propylene oxide in a molar ratio of ethylene oxide to propylene oxide of 1/5 to 5/1 in the production of the nonionic surfactant (C).

Examples of the monohydric alcohols to be used for producing the nonionic surfactant (C) include those having an alkyl or alkenyl moiety of 8 to 24 carbon atoms, and those having an alkylphenyl moiety wherein the alkyl moiety having 6 to 14 carbon atoms, and specific examples thereof include those mentioned in the foregoing description relating to the nonionic surfactant (A). Among nonionic surfactants (C), those having an alkyl or alkenyl group, particularly an alkyl group, represented by R of 14 to 24 carbon atoms are preferred.

<Nonionic surfactant (D): A reaction product obtained by adding an alkylene oxide to a polyvalent carboxylic acid or an acid anhydride thereof, or a reaction product obtained by adding an alkylne oxide to a mixture of a polyvalent (or polybasic) carboxylic acid or an acid anhydride thereof, and an alcohol>

Examples of the polyvalent (or polybasic) carboxylic acid and acid anhydride thereof as a starting material of the nonionic surfactant (D) include oxalic acid, malonic acid, succinic acid, methylsuccinic acid, maleic acid, glutaric acid, adipic acid, phthalic acid, fumaric acid, itaconic acid, malic acid, tartaric acid, maleinized (or maleated) oleic acid, citric acid, percitric acid, trimellitic acid, butanetetracarboxylic acid, pyromellitic acid, tetradecanehexacarboxylic acid, maleic anhydride, succinic anhydride, oxalic anhydride, itaconic anhydride, glutaric anhydride, phthalic anhydride, trimellitic anhydride, pyromellitic anhydride, and stearylsuccinic anhydride.

Dimer acids and polymer acids of higher fatty acids having 14 to 22 carbon atoms are also included in the scope of the polybasic carboxylic acids. Dimer acids and polymer acids herein can be synthesized by a method wherein a monoolefinic carboxylic acid or a diolefinic carboxylic acid, such as an unsaturated fatty acid monomer, e.g., oleic acid, linoleic acid, and linolenic acid, is subjected to thermal polymerization such as a Diels-Alder reaction, or another method. The polymer acid herein is a polyearboxylic acid having 3 or more carboxyl groups in a molecule and does not includes a dimer acid. The dimer acid or polymer acid used herein may be a mixture thereof with an unreacted monomer acid. That is, it is not concerned that an unreacted monomer acid is present as far as the effects of the present invention are not failed.

Examples of the alcohol as a starting material of the nonionic surfactant (D) include monohydric and polyhydric alcohols, and specific examples thereof include those mentioned in the foregoing description relating to the nonionic surfactant (A).

In the production of the nonionic surfactant (D) with a polybasic carboxylic acid or an acid anhydride thereof (I) and an alcohol (II), the compounds (I) and (II) are preferably used in a molar ratio of (I) to (II) of 1/0.02 to 5, particularly 1/0.1 to 3. When the molar ratio falls within this range, the above-mentioned nonionic surfactant (D) can efficiently collect fine ink drops and the collected ink drops are effectively removed out in flotation.

On the other hand, higher fatty acids or salts thereof are suitably used as the anionic surfactant. Quaternary ammonium salts are used as the cationic surfactant, mono(long-chain alkyl) quaternary ammonium salts are particularly preferred.

The surfactant may be added in any step of the deinking process. However, it is usually added in the pulping step. The addition amount thereof is not particularly restricted. Any known deinking agent other than the foregoing nonionic surfactants (A) to (D) may of course be used in combination therewith.

In the deinking process of the present invention, the aforementioned contact angle can be controlled to be in the desired range by adjusting the pH of the slurry in the flotation step, preferably by adjusting the pH in the range of 4 to 10. A method wherein a cationic compound, an amine, an acid salt of an amine, or an amphoteric compound is added to the slurry in the flotation step can also be mentioned as another contact angle control method. In the present invention, the two methods are especially preferably used in combination. Examples of the cationic compounds, the amines, the acid salts of amine, and the amphoteric compounds include the following compounds. The use of these compounds serves to control the contact angle and decrease the "sad color" of the pulp sheet.

<Cationic Compound>

Examples of the cationic compounds include mono (long-chain alkyl) quaternary ammonium salts, di (long-chain alkyl) quaternary ammonium salts, pyridinium salts having a substituent group on the nitrogen atom thereof, and cationic polymers. Among cationic compounds, particularly preferred are ones represented by the following formulae ($a_1$) to ($b_1$):

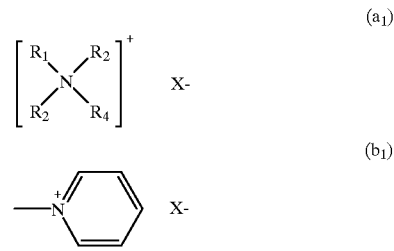

in the formulae ($a_1$) to ($b_1$), $R_1$ and $R_2$ may be the same or different from each other and each represents an alkyl, alkenyl or β-hydroxyalkyl group having 10 to 24 carbon atoms; $R_3$ and $R_4$ may be the same or different from one each other and each represents an alkyl or hydroxyalkyl group having 1 to 8 carbon atoms, a benzyl group, or a group represented by the formula: —(AO)$_n$—Z (wherein AO represented by an oxyalkylene group having 2 to 4 carbon atoms; Z represents a hydrogen atom or an acyl group; and n is an integer of from 1 to 50); X⁻ represents a counter ion; and Y represents an alkyl, alkenyl or β-hydroxyalkyl group having 8 to 36 carbon atoms, a group represented by the formula: $R_5COOCH_2$— (wherein $R_5$ represents an alkyl, alkenyl or β-hydroxyalkyl group having 8 to 36 carbon atoms), a group represented by the formula: $R_5CONHCH_2$— (wherein $R_5$ is as defined above) or a group represented by the formula: $R_5OCH_2$— (wherein $R_5$ is as defined above).

<Amine and Acid Salt of Amine>

Examples of the amines and the acid salts of the amines include primary amines, secondary amines, tertiary amines, cyclic amines, imidazoles, imidazolines, inorganic acid salts of these amines, organic acid salts of these amines, and polymers containing amino groups. Among them, particularly preferred are ones represented by the following formulae ($a_2$) to ($d_2$):

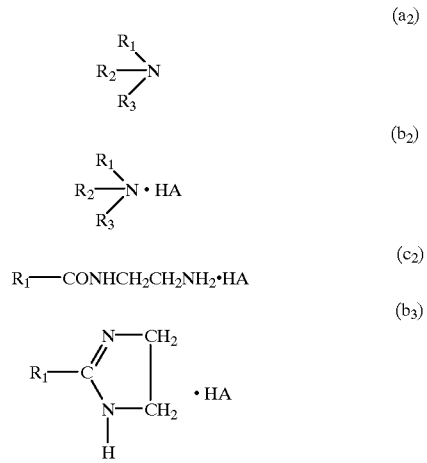

in the formulae ($a_2$) to ($d_2$), $R_1$ represents an alkyl, alkenyl or β-hydroxyalkyl group having 8 to 36 carbon atoms; $R_2$ and $R_3$ may be the same or different from each other and each represents a hydrogen atom, an alkyl group having 1 to 24 carbon atoms or an alkenyl group having 2 to 24 carbon atoms; and HA represents an inorganic or organic acid.
<Amphoteric Compound>

Examples of the amphoteric compounds include betaines, amine oxides, phospholipids, proteins, and amphoteric polymers. Among them, particularly preferred are ones represented by the following formulae ($a_3$) to ($b_3$):

$$R_2-\underset{R_3}{\overset{R_1}{N}}\rightarrow O \quad (a_3)$$

$$R_4-NHCH_2CH_2COOM \quad (b_3)$$

in the formulae ($a_3$) to ($b_3$), $R_1$, $R_2$ and $R_3$ may be the same or different from one another and each represents an alkyl group having 1 to 24 carbon atoms or an alkenyl group having 2 to 24 carbon atoms; $R_4$ represents an alkyl, alkenyl or β-hydroxyalkyl group having 8 to 36 carbon atoms; and M represents a hydrogen atom, an alkali metal atom, ½ mole of an alkaline earth metal atom or an ammonium group.

The amount of at least one compound selected from the foregoing group consisting of cationic compounds, amines, acid salts of amines, and amphoteric compounds that may be added is preferably 0.001 to 5.0% by weight, especially preferably 0.01 to 1.0% by weight, based on the absolute dry weight of wastepaper, though it is not particularly limited in so far as it is such an amount as to set the aforementioned contact angle at 70° or higher in the flotation step.

The deinking process of the present invention, which is characterized by the aforementioned control of the contact angle of the aqueous solution portion of a slurry containing the stripped ink with the interfaces of ink particles, at least comprises the step of stripping ink from wastepaper and the step of removing the stripped ink from the flotation system. Other steps can be carried out in accordance with the conventional deinking methods. That is, the deinking process may comprise, as the main steps, a disintegration (or pulping) step, an aging step, (if necessary, a kneading step), a flotation step and a washing step. The deinking process may further comprise other step(s), if necessary. The respective steps may be carried out two or more times.

EXAMPLES

The following Examples will more specifically illustrate the present invention, though they should not be construed as limiting the scope of the present invention.
<Compound to be Added>

Amines, acid salts of amines, cationic compounds and amphoteric compounds additionally used, if necessary, in the following Examples are listed in the following Tables 1 to 8.

TABLE 1

| Formula | Compd. No. | Structure in the Formula | | |
|---|---|---|---|---|
| | | $R_1$ | $R_2$ | $R_3$ |
| $R_2-\underset{R_3}{\overset{R_1}{N}}$ | I-a-1 | 12 | H | H |
| | I-a-2 | 18 | 4 | 4 |

TABLE 2

| Formula | Compd. No. | Structure in the Formula | | | |
|---|---|---|---|---|---|
| | | $R_1$ | $R_2$ | $R_3$ | HA |
| $R_2-\underset{R_3}{\overset{R_1}{N}}\cdot HA$ | I-b-1 | 12 | H | H | $CH_3COOH$ |

TABLE 3

| Formula | Compd. No. | Structure in the Formula | |
|---|---|---|---|
| | | $R_1$ | HA |
| $R_1CONHCH_2CH_2NH_2 \cdot HA$ | I-c-1 | 12 | HCl |

TABLE 4

| Formula | Compd. No. | Structure in the Formula | |
|---|---|---|---|
| | | $R_1$ | HA |
| $R_1C\underset{NH-CH_2}{\overset{N=CH_2}{\diagdown}} \cdot HA$ | I-d-3 | 22 | HCl |

TABLE 5

| Formula | Compd. No. | Structure in the Formula | | |
|---|---|---|---|---|
| | | $R_1$ | $R_2$ | $R_3$ |
| $R_2-\underset{R_3}{\overset{R_1}{N}}\rightarrow O$ | II-a-1 | 12 | 1 | 1 |

TABLE 6

| Formula | Compd. No. | Structure in the Formula | |
|---|---|---|---|
| | | $R_1$ | M |
| $R_4NHCH_2CH_2COOM$ | II-b-1 | 22 | $R_4$ |

TABLE 7

| Formula | Compd. No. | Structure in the Formula | | | | |
|---|---|---|---|---|---|---|
| | | $R_1$ | $R_2$ | $R_3$ | $R_4$ | $X^-$ |
| $\left(\underset{R_2}{\overset{R_1}{\diagdown}}N\underset{R_4}{\overset{R_3}{\diagup}}\right)^+ X^-$ | III-a-1 | 10 | 24 | 1 | 1 | $Cl^-$ |

TABLE 8

| Formula | Compd. No. | Structure in the Formula Y | X⁻ |
|---|---|---|---|
|  | III-b-1 | $C_{12}H_{25}CONHCH_2-$ | Cl⁻ |

Example 1

Wastepapers (newspapers/leaflets:70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.2% by weight (based on the starting material) of a block adduct of stearyl alcohol with 10 moles of EO and 10 moles of PO (in terms of the average number of moles of addition) as a deinking agent were added thereto, and the resultant mixture having a pulp concentration of 5% by weight was disintegrated at 40° C. for 10 minutes. The resulting pulp slurry was aged at 40° C. for 60 minutes, and then warm water was added for dilution to a pulp concentration of 1%. The pulp slurry was adjusted with respect to the pH by using sulfuric acid as shown in Table 9, at which stage the compound to be added as shown in Table 9, if to be added, was further added for contact angle measurement. The amount of the added compound of Table 9 was based on the absolute dry weight of wastepaper. The pulp slurry was subject to flotation at 40° C. for 10 minutes. Herein, the contact angle was measured in the aforementioned manner. After the flotation treatment, pulp slurry was treated on a TAPPI standard sheet machine to give pulp sheet. The pulp sheet thus obtained was pressed under a pressure of 5 kgf/cm² and then air-dried to evaluate the prevention of the sad color of the pulp. The results are shown in Table 9. As for the evaluation of the pulp sheets, aluminium sulphate (sodium sulfate) was added to the pulp slurry after flotation to adjust the pH thereof to at most 5, followed by papermaking. The sad color of the resulting pulp sheet was relatively evaluated visually according to the following ratings while using pulp sheets made according to conventional methods as a standard (rating 3). A difference of a rating of 1 in the sad color prevention can be well recognized as a visual difference. A rating of 4 or higher in the sad color prevention indicates that the pulp sheets were so obviously bright in comparison with pulps made according to conventional methods that the results of handwriting or printing on the sheets were also vivid. By contrast, a rating of 2 or lower indicates that pulp sheets were unfit for use.

5: good without sad color in comparison with sheets made according to conventional methods, 4: substantially good without the appearance of sad color in comparison with sheets made according to conventional methods, 3: ordinary (according to conventional methods), 2: with a slight appearance of sad color in comparison with sheets made according to conventional methods, and 1: with an appearance of sad color in comparison with sheets made according to conventional methods.

TABLE 9

| Test No. | pH | Contact angle (°) Before F/T | Contact angle (°) in F/T | Compd. to be added Symbol | Compd. to be added Concn. (%) | Sad color prevention |
|---|---|---|---|---|---|---|
| 1 | 10.0 | — | 60.0 | — | 0.35 | 3 |
| 2 | 9.0 | — | 60.8 | — | — | 3 |
| 3 | 7.5 | — | 63.7 | — | — | 3 |
| 4 | 7.0 | — | 65.4 | — | — | 3 |
| 5 | 6.0 | — | 60.3 | — | — | 3 |
| 6 | 10.0 | 70.3 | 70.5 | I-a-1 | 0.35 | 4 |
| 7 | 9.0 | 73.5 | 74.0 | I-b-1 | 0.4 | 4 |
| 8 | 9.0 | 74.0 | 73.2 | I-c-1 | 0.4 | 4 |
| 9 | 7.0 | 77.1 | 77.5 | I-a-2 | 0.2 | 4 |
| 10 | 7.0 | 81.3 | 82.8 | I-b-1 | 0.2 | 5 |
| 11 | 7.0 | 77.9 | 78.4 | I-c-1 | 0.2 | 5 |
| 12 | 7.0 | 77.0 | 77.2 | II-b-1 | 0.25 | 4 |
| 13 | 7.0 | 78.1 | 78.4 | III-a-1 | 0.3 | 4 |
| 14 | 7.5 | 80.0 | 80.4 | I-d-1 | 0.2 | 5 |
| 15 | 7.5 | 76.2 | 76.4 | II-a-1 | 0.2 | 4 |
| 16 | 7.5 | 77.3 | 77.0 | III-b-1 | 0.2 | 5 |

F/T: flotation step.

Example 2

Wastepapers (newspapers/leaflets:70/30) as the starting material which were recovered in a city were cut into 4 cm×4 cm pieces. A given amount thereof was fed into a bench disintegrator. Then, warm water, 1% by weight (based on the starting material) of sodium hydroxide, 3% by weight (based on the starting material) of sodium silicate, 3% by weight (based on the starting material) of a 30% aqueous solution of hydrogen peroxide and 0.2% by weight (based on the starting material) of a random adduct of stearic acid with 15 moles of EO and 10 moles of PO (in terms of the average number of moles of addition) as a deinking agent were added thereto, and the resultant mixture having a pulp concentration of 4% by weight was disintegrated at 40° C. for 10 minutes. The resulting pulp slurry was aged at 40° C. for 60 minutes, and then warm water was added for dilution to a pulp concentration of 1%, and mixed with the compound to be added as shown in Table 10, for contact angle measurement. The amount of the added compound of Table 10 was based on the absolute dry weight of wastepaper. The pulp slurry was subject to flotation at 40° C. for 10 minutes. After the flotation treatment, pulp slurry was treated on a TAPPI standard sheet machine to give pulp sheet. The pulp sheet thus obtained were pressed under a pressure of 5 kgf/cm² and then air-dried to evaluate sad color prevention. The results are shown in Table 10. In this Example as well, the contact angle was measured in the aforementioned manner, while the sad color prevention was evaluated in the same manner as in Example 1.

TABLE 10

| Test No. | Contact angle (°) Before F/T | Contact angle (°) in F/T | Compd. to be added Symbol | Compd. to be added Concn. (%) | Sad color prevention |
|---|---|---|---|---|---|
| 17 | — | 60.2 | — | — | 3 |
| 18 | 70.0 | 70.2 | perfluoro-alkylethanol | 0.5 | 4 |
| 19 | 78.4 | 79.8 | silicone oil emulsion | 0.5 | 5 |
| 20 | 81.5 | 81.2 | stearic acid | 0.2 | 4 |

F/T: flotation step.
*silicone oil emulsion: 30% emulsion of dimethyl-silicone oil (MW: 1,000)

We claim:

1. A deinking process comprising the step of stripping ink from a wastepaper of newspaper, leaflets, magazines and mixtures thereof as the starting material and the step of removing the stripped ink by a flotation method, characterized by continuing deinking treatment when the contact angle of the aqueous solution portion of a slurry with the interfaces of ink particles in the flotation step is at least 70°.

2. A method for controlling the deinking performance in a deinking process comprising at least the step of stripping ink from a pulp slurry formed from a wastepaper of newspaper, leaflets, magazines and mixtures thereof as the starting material, and the step of removing the stripped ink by flotation, characterized by measuring before or in the flotation step the contact angle of the aqueous solution portion of said pulp slurry containing said stripped ink with the interfaces of ink particles and adjusting the contact angle to a value of at least 70°.

3. A deinking process comprising at least the step of stripping ink from a pulp slurry formed from a wastepaper of newspaper, leaflets, magazines and mixtures thereof as the starting material wherein at least one surfactant is used for ink stripping, and the step of removing the stripped ink by flotation, characterized by controlling before or in the flotation step the contact angle of the aqueous solution portion of said pulp slurry containing said stripped ink with the interfaces of ink particles to be at least 70°; wherein the contact angle is controlled by adding to said slurry at least one member selected from the group consisting of silicon-containing organic compounds, fluorine-containing organic compounds, cationic compounds, amines, acid salts of amines, and amphoteric compounds.

4. The deinking process as claimed in claim 3, wherein the contact angle is further controlled by adjusting the pH of said slurry.

5. The deinking process as claimed in claim 4, wherein the pH is adjusted in the range of 4 to 10.

6. The deinking process as claimed in claim 5, wherein the flotation step is carried out after said contact angle is adjusted to at least 70°.

7. The deinking process as claimed in claim 4, wherein the flotation step is carried out after said contact angle is adjusted to at least 70°.

8. The deinking process as claimed in claim 3, wherein the flotation step is carried out after said contact angle is adjusted to at least 70°.

9. The deinking process as claimed in claim 3, wherein the flotation step is carried out after said contact angle is adjusted to at least 70°.

10. The deinking process as claimed in claim 3, wherein the contact angle is controlled to be 70° to 100°.

11. The deinking process as claimed in claim 3, wherein the contact angle is controlled to be 70° to 90°.

* * * * *